Aug. 25, 1936.    A. L. KOCH    2,052,476
METHOD AND APPARATUS FOR PRODUCING BEVERAGES
Filed May 2, 1935    2 Sheets-Sheet 1
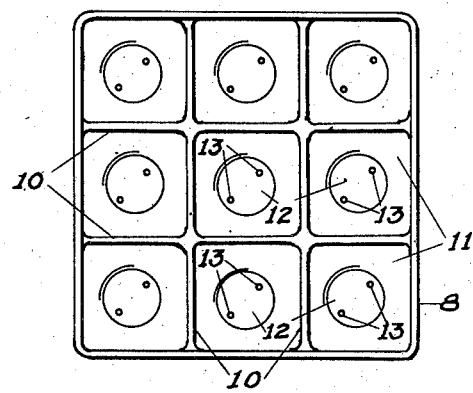
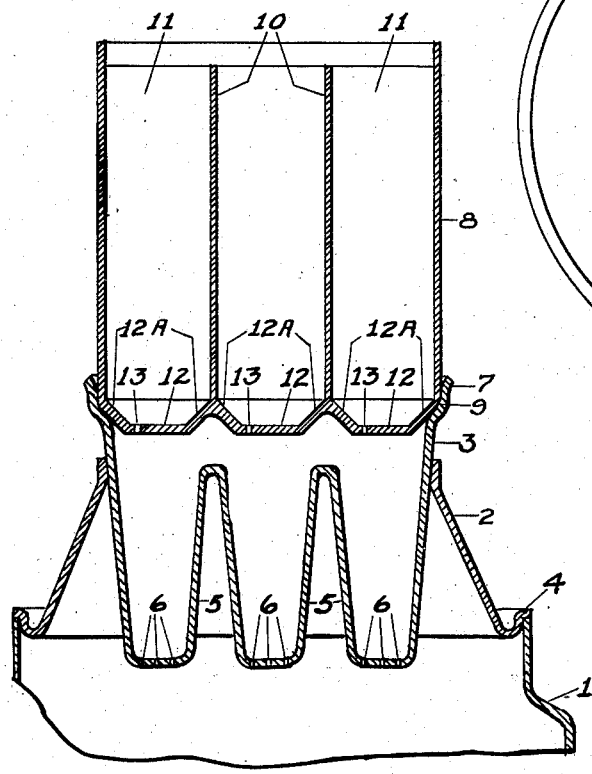
Arthur L. Koch. INVENTOR.
BY
ATTORNEYS.

Aug. 25, 1936.   A. L. KOCH   2,052,476
METHOD AND APPARATUS FOR PRODUCING BEVERAGES
Filed May 2, 1935   2 Sheets-Sheet 2
Fig. 4.
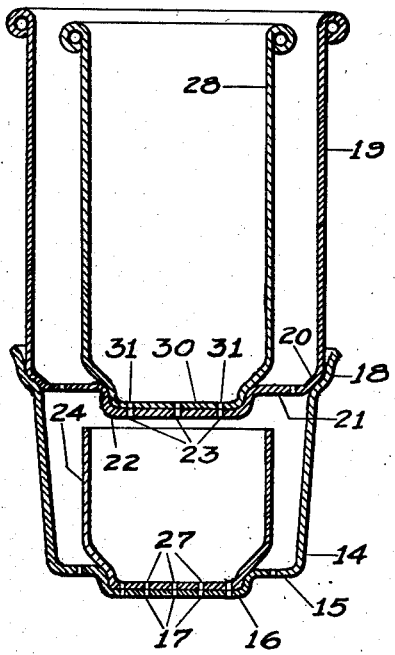
Fig. 9.
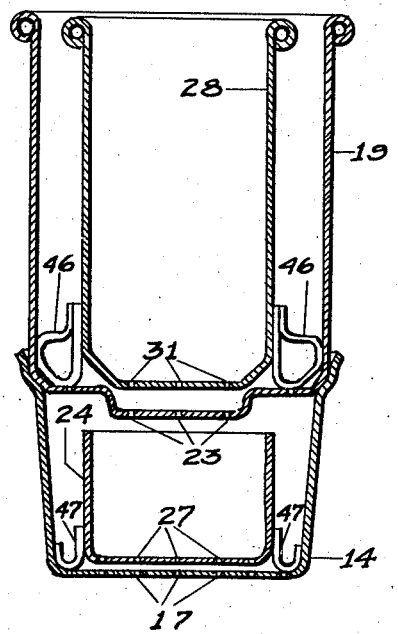
Fig. 7.
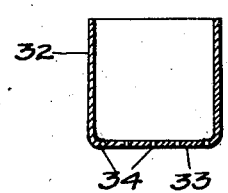
Fig. 8.
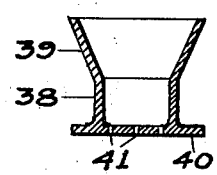
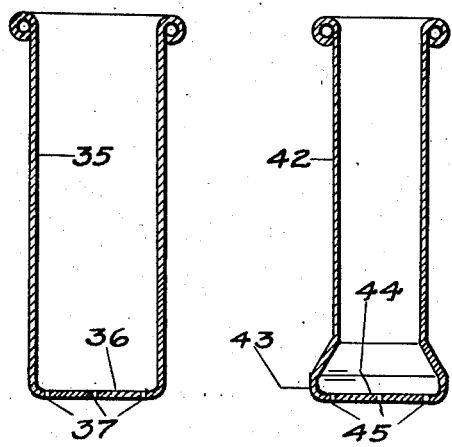
Fig. 5.   Fig. 6.
Arthur L. Koch. INVENTOR.
BY Bomford Hamilton
ATTORNEYS.

Patented Aug. 25, 1936

2,052,476

UNITED STATES PATENT OFFICE 2,052,476

METHOD AND APPARATUS FOR PRODUCING BEVERAGES

Arthur L. Koch, Perth Amboy, N. J.

Application May 2, 1935, Serial No. 19,376

11 Claims. (Cl. 53—3)

In the art of the preparation of food beverages, such as carried out in connection with domestic cooking operations, it is the standard mode of procedure to prepare infusions of the beverage by treating beverage-producing materials with a suitable liquid which is capable of dissolving or extracting from the solid materials those flavored ingredients which produce the characteristic and pleasing taste to the beverages; and this is the general procedure whether the beverage being made is tea, coffee, cocoa, or various other beverages, including several of the so-called "cereal beverages."

Thus, in making coffee, the usual procedure is to subject ground coffee beans to the solvent action of hot water, which extracts from the ground material the flavoring components which make the beverage. One mode of procedure is to steep the ground coffee beans contained in a suitable container in a body of boiling water until the desired extraction of water-soluble components is accomplished. Another method is where the boiling water is repeatedly circulated through a layer of the ground coffee until the desired result is obtained, this being the basis of the so-called "percolation" method.

Still another method is the so-called "drip" method, which is a true percolation method in that a suitable volume of hot water is allowed to drip onto a bed of the ground coffee, and to penetrate or percolate slowly therethrough, the resulting beverage being collected in a suitable receptacle placed beneath the bed of ground coffee. The water is passed through the coffee bed only once.

These various methods are all uneconomical, wasting much of the coffee because of inefficient extraction, or extracting ill-tasting components along with the desirable ones.

Although the quality of beverage produced by the drip method is excellent, the method is wasteful of coffee as it is usually carried out in the equipment customarily provided therefor.

This equipment comprises a structure divided into a plurality of superposed compartments, the bottom one of which is adapted to contain the finished beverage, the intermediate compartment contains the ground coffee and the top compartment contains the hot water. Suitable openings through the bottom of the top compartment allow the water to drip onto the ground coffee in the intermediate compartment, and drainage openings therethrough allow the finished coffee beverage to drain into the bottom compartment.

The volumetric capacity of each compartment is fixed by the intended capacity of the appliance, which is hereinafter referred to as a "coffee pot". Thus if the coffee pot is of such size as to make, for example, six cups of satisfactory beverage coffee, the bottom compartment is designed to hold a volume of coffee equivalent to six standard cups, the intermediate compartment is designed to hold just sufficient ground coffee which is required for the six cups of finished beverage, and the top compartment is designed to hold just enough boiling water to make the six finished cups of finished beverage plus the amount of water which will be retained absorbed by the bed of ground coffee.

Now it will be apparent that the quantity of ground coffee required for the rated capacity of the coffee pot will make a bed of ground coffee of substantially a definite depth and area; and it be understood also that the volume of water required for a satisfactory extraction of the soluble constituents of this bed will be such that all parts of the bed will be thoroughly and uniformly wetted by the water, and that, because of the definite thickness of the bed, a definite time for percolation of the water through the bed will be required in order to give proper extraction.

These factors are all in definite adjusted relation for the rated capacity of the coffee pot, and the relation is such as will yield a satisfactory standard beverage for the rated capacity of the coffee pot.

However, if it is not desired to use as much coffee beverage as the pot will make, either an excess quantity of coffee must be made in accordance with the capacity of the coffee pot, which would be wasteful, or else trouble is encountered in obtaining a beverage of satisfactory standard qualities. Thus, suppose only three cups of coffee are wished to be made in a six cup pot.

In such case, if only half the amount of ground coffee were placed in the pot as is required for the six cups, the smaller amount of ground coffee will be spread over the same area as is the case for the larger amount, but the depth of the layer is only half as much as in the case of the larger amount; and if only half as much water is used as would be used for six cups, this less amount of water would be called upon to wet the same area of coffee as is the six cup volume, and it has only half as deep a layer of ground coffee to penetrate, both of which factors diminish the amount of extraction performed by the water and results in a sub-standard beverage.

It has been found that in order to produce a standard beverage regardless of the volume, there should be maintained a definite ratio between the depth of the bed of ground coffee and the volume of water, so that whatever the volume of water may be used, the time of contact with the bed of ground coffee and the overall penetration of the bed by the water will be substantially constant, thereby maintaining a beverage of standard strength and flavor regardless of what amount of the beverage may be produced.

The present invention has for its object the provision of a novel and improved coffee pot, the capacity of which may be adjusted to produce variable amounts of finished beverage of standard strength and flavor notwithstanding the volume thereof which may be produced, in which the above-indicated ratios are maintained regardless of the various quantities of the ingredients which may be employed.

Other objects and advantages of the invention will become apparent as the description proceeds, and the features of novelty will be set forth in detail in the appended claims.

Briefly, the invention provides a coffee-pot of the above-indicated character, which is divided into a plurality of individual containers of different capacities the volumes of which are so proportioned that for a given amount of ground coffee which may be placed therein, the depth and area of ground coffee will be proportioned automatically, to the volume of water to be used so that the time of percolation and degree of contact of the water relatively to the ground coffee will be the same, regardless of whether only one cup, or a plurality of cups, of coffee may be wished to be made, so that the same standard of strength and flavor of the finished product will be obtained uniformly. These containers may be either a fixed part of the coffee pot structure, or they may be made so as to be at will insertable into and removable from the coffee pot structure.

The invention will be understood more readily from the accompanying drawings, in which:

Figure 1 is a vertical section through one form of a construction embodying the principles of the present invention.

Figure 2 is a top plan view of the device of Figure 1, the device having its cover in position.

Figure 3 is a plan view of the intermediate section which is adapted to hold the solid beverage-producing material.

Figure 4 is a vertical section through a modified form of the invention.

Figures 5 and 6 are vertical sections through forms of water containers to be used with the apparatus of Figure 4.

Figures 7 and 8 are views in vertical section through coffee containers to be used with the apparatus of Figure 4.

Figure 9 is a vertical section through still another form of the invention showing guide means for aligning the drip openings.

Referring more particularly to the drawings, and especially to Figures 1, 2 and 3, it will be seen that the present improved coffee pot may comprise a plurality of superposed sections or compartments conveniently formed of metal 1, 3 and 8, which compartments are shown as interfitting and being held frictionally in position by the resiliency of the metal, and which enables the parts to be readily fitted together and removed. The bottom compartment 1 forms the receptacle for the finished beverage, compartment 3 is the holder for the solid material, for example, ground coffee, which is to be subjected to the action of hot water or milk, or the like, contained in the compartment 8.

The receptacle 3 is shown as being inserted in a connecting sleeve 2, which is conveniently a unit separable from the receptacles 1 and 3, the sleeve 2 including a flange 4 which is adapted to rest on the top of the receptacle 1. It will be seen that the sleeve 2 is substantially straight-walled whereas the container 3 flares outwardly somewhat, so that when it is inserted in the sleeve 2, it will wedge therein and thus will be held in place firmly and without danger of becoming accidentally displaced.

The container 3 is divided into a plurality of wells 5, in which the ground coffee or other beverage producing substance is to be placed. Any desired number of the wells may be provided, depending upon the capacity of the container 1. In the illustrated form, nine of such wells are shown.

All of these wells are of uniform depth and cross sectional area and the walls thereof may be uniformly tapered. These wells are each adapted to receive enough material such as ground coffee to make a cup of what may be termed a satisfactory "standard" finished beverage, the actual quantity of material which is placed in the wells 5 depending upon the grade and quality of material. If, for example, it is wished to use a tablespoon full of material for each cup of coffee, this measured quantity is placed in each of as many of the wells 5 as there are cups of finished brew desired; and because of the fact that the wells 5 are all of the same depth, and the same uniform cross sectional area, and of the same slope of sides, it will be apparent that the same amount of beverage-making material placed in the wells, will form the same depth of bed in all of the wells in which the material is placed; further by this time it will have become apparent that the same coffee pot may be used for making any amount of coffee from one to nine cups, and that the quality of the product will be uniform and made without waste of material, whether only one cup, or all nine cups of finished beverage may be made.

The wells 5 have perforated bottoms 6 through which the brewed beverage passes into the receptacle 1. If desired, additional drain holes may be provided around the sides of wells 5.

The upper portion 7 of the container 3 flares outwardly somewhat, and forms a shoulder 9 in which fits the container 8, which receives the water or other extracting medium from which the beverage is made, the flare 7 forming a guide for properly positioning the container 8 on shoulder 7. As is the case of the container 3, the container 8 is divided into a plurality of compartments 11 by means of the partitions 10. These compartments 11 correspond to the wells 5, and when the receptacle or section 8 is inserted in the flared portion 7 of the container 3, each of the wells 5 has its compartment 11 superposed upon it in axial alignment. Each of the compartments 11 is of the same depth and the same uniform cross sectional area, and is adapted to hold enough hot water or other extracting liquid to make a definite volume, for instance one cup of finished beverage. The bottoms 12 of the compartments 11 are provided with drip openings 13, positioned over each of the wells 5, the bottoms 12 being sloped as indicated at 12a towards the drip openings 13 to assure complete drainage of the liquid from the compartments 11. Now, since the drip holes 13 are of the same size, since the compartments themselves are of the same size and the same volume of water in each compartment will fill the compartments 11 to the same level, since the water in the compartments will flow through the drip holes 13 in the same time, and the equal volumes of water from the compartments 11 will have to pass through beds of beverage making material of equal depth in the wells 5, it is apparent that with the same grade of coffee or other material in the wells 5, the quality of the beverage produced from each of the wells will be the same standard as that produced from every other well; and not only will the same standard of beverage be produced from each of the wells by the present improved construction, but there will be no waste of material, as in effect the large capacity unit is made of an assembly of individual units each functioning in the same manner as the large capacity unit, and each of the individual units retaining in itself the same constant proportions as are present in a single large capacity pot having a capacity equal to the aggregate capacities of the individual units; and whether one cup of beverage is prepared, or whether nine cups, the quality is of uniform standard, there is no waste of material, and further economy is effected by the fact that the same apparatus will produce as much of the beverage as is desired anywhere between the limits of its minimum and maximum capacities, thereby giving a high degree of flexibility of use.

Reference may now be made to Figures 4 to 8 inclusive which show a modified form of apparatus operating however, on the same principle as that described above. In these views the receptacle 1 is not shown, it being understood that the assembly of Figure 4 is adapted to be received in the receptacle 1 in a manner wholly similar to that described above.

In the assembly of Figure 4, the reference numeral 14 designates a coffee container which is adapted to contain enough ground coffee for producing the full capacity of the receptacle 1 of standard finished beverage, for example, nine cups of finished beverage. The quantity of ground coffee placed in this receptacle 14, for instance nine tablespoonfuls, for illustrative purposes, when leveled off will fill the container 14 to a certain depth, as is obvious. The container 14 then is fitted into the beverage-receiving receptacle 1. The annular shoulder 15 of the container 14 defines a well 16 having drip holes 17 through its bottom, although additional drainage may be provided as may be necessary, the shoulder 15 forming a guide for directing all of the beverage passing from the container 14 to the holes 17, thereby promoting complete drainage of the solid container 14.

The container 14 is provided with an outwardly flaring portion 18, which receives the tapered bottom part 20 of the water container 19, the taper 20 tending to press the flare 18 outwardly and seating in the flare, thereby holding the water container 19 in position. The water container 19 is of sufficient capacity to hold the amount of water requisite for extraction of the material in the container 14. The bottom of the container 19 is formed of an annular shoulder 21 and a well 22 having drip holes 23 therethrough, the shoulder 21 facilitating drainage of water through the holes 23 by guiding the water therethrough; obviously additional drain holes may be provided if needed.

It will be remembered that the construction just described is for the full capacity of the device, assumed for purposes of illustration to be nine cups; and it will be recalled that the required amount of solid material for producing these nine cups fills the container 14 to a definite depth and that the volume of the container 19 is such as to hold the required amount of water for properly extracting the bed of ground coffee in the container 14.

With these considerations in mind, if it be desired to make less beverage than the full capacity of the device, for instance, only three cups, if only the proportionate amount of coffee were placed in the container 14, it would make a considerably thinner layer in the container 14 and the reduced amount of water in the container 19 would not only have the thinner bed to pass through, but because of the comparatively large area presented to the small volume of water, it will not be thoroughly wetted; in brief the entire conditions producing a standard quality of beverage will have been destroyed.

Therefore, in order to utilize the standard size of equipment, but maintaining constant the proportional depth and area of the bed containing, however, proportionately reduced quantity of ground coffee and of water, a proportionately smaller container 24, for the coffee and a proportionately smaller water container 28, so that when the said quantity of ground coffee is placed in the container 24, it will fill the container 24 to the same depth as the larger amount of material did the larger container 14 and the area of the bed presented to the volume of water in the container 28 will be proportional to the area of the larger quantity of ground coffee presented to the larger volume of water contained in the water container 19. In other words, the same conditions which produced a satisfactory standard quality of beverage when the device is operated at full capacity will be duplicated with the smaller units and the same quality of beverage will be produced without waste of material. It will be apparent of course that suitable drip openings are provided in the containers 24 and 28, these being indicated as 27 in the bottom 26 of the container 24 and as 31 in the bottom 30 of the container 28; and it will be obvious that the holes 27 should register exactly with the holes 17 and that the holes 31 should register exactly with the holes 23, the wells 16 and 22 forming seats for the bottoms 26 and 30 of the containers 24 and 28 respectively, the tapering sides of these wells properly centering the containers 24 and 28 so that the holes will be brought into proper registration, as above explained.

In the event that there should be desired to produce still smaller amounts of finished beverage, smaller containers such as 32 and 35 may be substituted for the containers 24 and 28, respectively, which may be adapted for the production of, say, three cups of beverage, or containers 38 and 42, respectively, if but a single cup is desired. It will be seen that the bottom 33 of the container 32 is perforated as shown at 34, and that the water container 35 is provided with drip openings 37 through its bottom 36. The cross section of the bottom 36 of the water container 45 is equal to that of the well 22, so that when the container 35 is used to replace the container 28, the container 35 will snugly fit into the well 22, so that the holes 37 will register with the drip holes 23 of the bottom 21 of the section 19; and the holes 34 with at least certain of the drip holes 17 in the container 14.

Likewise, the water container 42 is adapted to fit snugly in the well 22, and the drip holes 45, 45 thereof need register with the drip holes 23 of the container 19. For this purpose the end 43 of the water container 42 is enlarged in order to produce this snug fit; and to correspond thereto the upper portion of the container 38 is outwardly flared as shown at 39. Likewise, in order for the container 38 to fit snugly into the well 16 so that drain holes 41 will register with the drain holes 17 of the well 16, the container 38 is provided with a flange 40, which by engaging the sides of the well 16, guides the container 38 into proper position.

Always, however, the diameter and volume of these receptacles are so proportioned that the same constant depth and area of the bed of material being extracted is the same, irrespectively of whether one, three, six or nine cups of beverage are to be prepared, and the extraction conditions are maintained constant, while providing a wide flexibility as to the production of desired amounts of beverage without waste of material and the maintenance of a standard quality of finished product.

In order to facilitate aligning the drip openings or perforations in the coffee and water containers, suitable guides 46, 46 may be applied to the water containers, illustrated as the container 28, for example, which are adapted to engage the container 19 and to bring the holes 31 into alignment with the holes 23; and guides 47, 47 may be applied to the coffee containers, such as 24. These guides 46, 46 and 47, 47 are secured by riveting, welding, soldering or any other manner.

It will be noted that, in the construction in Figure 9, the guides 46, 46 and 47, 47 support the containers 28 and 24 respectively so that there will be a certain space between the bottoms thereof and the housings 19 and 14, so that the liquid will be enabled to drain efficiently even if the respective drain holes are not exactly aligned. This constitutes a possible added convenience over the form illustrated in Figure 4, where efficient drainage may not be effected unless the respective openings are in exact alignment.

It will be seen that not only will the same apparatus produce variable quantities of finished beverage of standard quality between the minimum and maximum limits of its capacity, and produce such variable quantities without waste of material, but there may be utilized to satisfactory advantage relatively inferior grades of ground beverage-producing material by determining by trial the relative amounts of such material and water which will produce a satisfactory finished product, and utilizing such material to form beds of uniform depth in the various containers or compartments, as above described thereby resulting in additional economy in use, as relatively cheaper grades of material may be utilized with satisfaction.

It is believed that the many advantages of a coffee pot constructed in accordance with the present invention will be readily understood, and although the preferred embodiments of the invention are as illustrated and described, it is to be understood that further modifications and changes in the details of construction may be resorted to as will be immediately apparent, without departing from the concept of the present invention; and it will be understood, therefore, that it is intended and desired to embrace within the scope of the invention such modifications and changes as may be necessary to adapt it to varying conditions and uses.

What is claimed is:

1. A coffee making apparatus comprising in combination, a receptacle open at its top, a coffee container mounted on the receptacle and having drip openings therethrough and a water container mounted on the coffee container and also provided with drip openings for permitting the water to flow by gravity into the coffee container, the said coffee container and water container comprising a plurality of corresponding individual wells having their dimensions proportioned so that for any predetermined volume of finished beverage a bed of coffee of the same depth and area will be presented to the same volume of water, so as to maintain constant extraction conditions regardless of whatever desired volume of finished coffee beverage of substantially standard uniform quality is to be produced.

2. A coffee making apparatus comprising, in combination, a receptacle open at its top, a coffee container mounted on the receptacle and having drip openings therethrough, a water container mounted on the coffee container and also having drip openings therethrough, for permitting the water to flow by gravity into the coffee container, the said coffee container and water container comprising a plurality of corresponding wells having their dimensions proportioned so that for any predetermined volume of finished beverage a bed of coffee of constant depth and area will be presented to the same volume of water, so as to maintain constant extraction conditions regardless of whatever desired volume of finished coffee beverage is to be produced, and means for aligning the wells of the water container with the wells of the coffee container.

3. A coffee making apparatus adapted to produce variable predetermined amounts of coffee beverage of standard quality, comprising, in combination, a receptacle open at its top, a coffee container mounted on the receptacle and having drip openings therethrough, a water container mounted on the coffee container and also having drip openings therethrough for permitting the water to flow by gravity into the coffee container, the said coffee container and water container comprising corresponding interchangeable wells having their dimensions proportioned so that for any predetermined volume of finished beverage a bed of coffee of constant depth and area will be presented to the same volume of water, so as to maintain constant extraction conditions regardless of whatever desired volume of finished coffee beverage is to be produced, and guides secured to the respective wells of the water and coffee container.

4. A coffee making apparatus comprising a receptacle open at its top, a coffee container mounted on the said receptacle and having drip openings therethrough, and a water container mounted on the coffee container, the said coffee container and the said water container comprising corresponding individual wells each of the wells in the water container being adapted to contain in a bed of constant depth and area sufficient ground coffee to produce a predetermined volume of finished beverage, and each of the wells in the water container being adapted to contain a sufficient volume of water to produce the desired predetermined volume of finished beverage, the wells of the water container and of the coffee container being proportioned so as to maintain constant the conditions of extraction to produce from each well a finished beverage of substantially standard quality, the said wells enabling the quantity of finished beverage to be varied at will between the limits of the capacity of the apparatus.

5. A coffee making apparatus comprising a receptacle, a container mounted on the receptacle, the container including a plurality of annularly spaced, depending wells for the reception of coffee, the wells having drip openings in the bottoms thereof, and a water container mounted in the upper portion of the coffee container, the said water container comprising a plurality of compartments conforming in a number to the wells and disposed thereabove, the bottoms of the compartments having drip openings therein for discharging the water by gravity into the wells, the wells and compartments being proportioned so as to maintain constant the conditions of extraction as to rate of flow of water, area and depth of coffee so as to produce from each well a finished beverage of substantially standard quality, the said wells enabling the quantity of finished beverage to be varied at will between the limits of the capacity of the apparatus.

6. A coffee pot for making coffee beverage by the drip method, which comprises, in combination, a receiver for finished coffee beverage, a container adapted to receive a bed of a suitable quantity of ground coffee sufficient to yield a predetermined variable volume of finished beverage, the said container forming a unit adapted to be positioned on the receiver and comprising a body member including a plurality of well-like compartments each of which is adapted to hold a unit quantity of ground coffee of the same depth, a water-receiving member adapted to be positioned above the said coffee-receiving container and comprising a body member including a plurality of water-receiving compartments corresponding to the said coffee receiving compartments, each of the water-receiving compartments registering with its corresponding coffee-receiving compartment upon assembling the apparatus, each of the water-receiving compartments being adapted to receive a unit volume of water, the water compartments and the coffee-receiving compartments being proportioned to maintain a constant relation between the volume of water and the depth and area of the coffee, and drip openings in the coffee-receiving compartments and the water-receiving compartments, the said drip openings being proportioned to adjust the rate of flow of water from each of the water-receiving compartments onto the bed of coffee in the coffee-receiving compartment therebeneath, and the rate of drainage of the water through the bed so that each unit volume of water will effect a substantially complete extraction of each unit quantity of coffee in each of the beds of coffee in a single pass, thereby producing a finished coffee beverage of the same standard strength and quality regardless of the variable total volume thereof to be produced in a given time.

7. A coffee pot for making coffee beverage by the drip method, which comprises the combination with a reservoir for finished coffee beverage, of a coffee-receiving unit adapted to deliver extracted coffee beverage to the reservoir, the said unit comprising a body having a plurality of well-like compartments therein, each of the compartments being adapted to contain a unit quantity of ground coffee and being of the same depth and area to form identical beds of coffee in each compartment, and a water-receiving member adapted to deliver water to the said beds of coffee, the said water-receiving member comprising a body including a plurality of well-like compartments corresponding to the coffee-receiving compartments each of the said compartments being adapted to deliver an identical volume of water to each of the identical coffee beds under identical conditions to produce identical quality of finished coffee beverage regardless of the number of compartments which may be used at a given time.

8. Beverage making apparatus of the class described comprising a container so constructed and arranged as to provide compartments for holding a unit bed of solid beverage-producing material of a predetermined depth or a multiple of such bed units of the same depth and a unit volume of solvent constant to the particular unit bed aforesaid, said compartments having drip openings so proportioned as to permit the solvent to drip onto the bed at a rate substantially equal to the rate of passage of the solvent through the bed to thereby avoid the formation of a relatively static volume of solvent in said bed.

9. The method of making a beverage by extraction of soluble components from a solid beverage-producing material, which comprises forming a bed of the said material to provide a plurality of units of the material, each unit presenting the same constant depth and area for each different quantity of beverage to be produced, and contacting in a single pass at a constant rate of time each of the said units with a predetermined unit of solvent proportioned to the particular unit of the said material for producing a substantially constant strength of finished beverage regardless of the volume of the finished product which is to be produced.

10. The method of making a beverage by the extraction of soluble components from a solid beverage-producing material which comprises the steps of forming a bed of said material of a predetermined depth and area to constitute a unit, disposing over said unit a unit of solvent of a predetermined volume proportioned to the particular unit of material for producing a unit quantity of beverage of the desired strength and feeding said solvent through said bed at a constant rate of time, and maintaining the depth of the bed and the rate of extraction the same for multiples of said units, whereby to produce a substantially constant strength of finished beverage regardless of the volume of finished beverage to be produced.

11. The method of making a beverage by extraction of soluble components from a solid beverage-producing material which comprises forming a bed of the said material to present a predetermined constant depth for all different quantities of beverage to be produced, maintaining the supply of solvent proportioned constant per unit of material for each different quantity and out of contact with the bed, and controlling the contact of solvent with the bed by allowing the solvent to drip onto the bed at a rate substantially equal to the rate of passage of the solvent through the bed, to thereby avoid the formation of a relatively static volume of solvent in contact therewith.

ARTHUR L. KOCH.